US008822955B2

(12) United States Patent
Zhong et al.

(10) Patent No.: US 8,822,955 B2
(45) Date of Patent: Sep. 2, 2014

(54) POLYMER-CONJUGATED QUANTUM DOTS AND METHODS OF MAKING THE SAME

(75) Inventors: Xinhua Zhong, Shanghai (CN); Yan Li, Shanghai (CN); Hua Zhang, Shanghai (CN); Lu Liu, Shanghai (CN)

(73) Assignee: East China University of Science and Technology (CN)

( * ) Notice: Subject to any disclaimer, the term of this patent is extended or adjusted under 35 U.S.C. 154(b) by 595 days.

(21) Appl. No.: 13/053,006

(22) Filed: Mar. 21, 2011

(65) Prior Publication Data

US 2012/0241646 A1    Sep. 27, 2012

(51) Int. Cl.
*G01J 1/58*    (2006.01)
*C09K 11/02*    (2006.01)
*B82Y 99/00*    (2011.01)
*B82Y 40/00*    (2011.01)

(52) U.S. Cl.
USPC ............... 250/459.1; 252/301.36; 977/774; 977/840

(58) Field of Classification Search
USPC .................... 523/205, 210; 977/774
See application file for complete search history.

(56) References Cited

U.S. PATENT DOCUMENTS

| | | |
|---|---|---|
| 6,444,143 B2 | 9/2002 | Bawendi |
| 2004/0033359 A1 | 2/2004 | Bawendi et al. |
| 2005/0192430 A1 | 9/2005 | Rosenthal et al. |
| 2007/0042576 A1 | 2/2007 | Chan et al. |
| 2007/0249064 A1 | 10/2007 | De La Fuente et al. |
| 2007/0269852 A1 | 11/2007 | Muys |
| 2009/0065742 A1 | 3/2009 | Shih et al. |
| 2009/0098663 A1 | 4/2009 | Han et al. |
| 2009/0275782 A1 | 11/2009 | Emrick et al. |
| 2010/0008861 A1 | 1/2010 | Shih et al. |
| 2010/0021957 A1 | 1/2010 | Lin et al. |
| 2010/0097691 A1 | 4/2010 | Memon et al. |

OTHER PUBLICATIONS

Xuhong Guo et al. Inorganic Chemistry, 2010, 49, 3768-3775.*
Li, J. et al., "Large-Scale Synthesis of Nearly Monodisperse CdSe/CdS Core/Shell Nanocrystals Using Air-Stable Reagents via Successive Ion Layer Adsorption and Reaction," Journal of American Chemical Society, Sep. 23, 2003, vol. 125, Issue 41, pp. 12567-12575.
Qu, L., et al., "Control of Photoluminescence Properties of CdSe Nanocrystals in Growth," Journal of American Chemical Society, Feb. 6, 2002, vol. 124, Issue 9, pp. 2049-2055.
Xie, R., et al., "Synthesis and Characterization of Highly Luminescent CdSe-Core CdS/Zn0.5Cd0.5S/ZnS Multishell Nanocrystals," Journal of American Chemical Society, Apr. 29, 2005, vol. 127, Issue 20, pp. 7480-7488.
Ballou, Byron, et al., "Noninvasive Imaging of Quantum Dots in Mice," *Bioconjugate Chem.*, 2004, 15 (1), pp. 79-86, Publication Date (Web): Dec. 30, 2003.
Bentzen, Elizabeth L.. et al., "Surface Modification to Reduce Nonspecific Binding of Quantum Dots in Live Cell Assays," *Bioconjugate Chem.*, 16 (6), pp. 1488-1494, Nov. 1, 2005.

(Continued)

*Primary Examiner* — Vu A Nguyen
(74) *Attorney, Agent, or Firm* — Knobbe Martens Olson & Bear LLP

(57) ABSTRACT

The present application relates to polymer-conjugated quantum dots. The quantum dots can include, for example, an inorganic core conjugated to a polymer. The quantum dots may, in some embodiments, be water-soluble and exhibit superior photoluminescence. Also disclosed are methods of making and using the quantum dots.

24 Claims, 5 Drawing Sheets

(56) References Cited

OTHER PUBLICATIONS

Chan, Warren C. W. et al., "Luminescent quantum dots for multiplexed biological detection and imaging," *Current Opinion in Biotechnology*, vol. 13, Issue 1, pp. 40-46, Feb. 2002.

Guo, et al., "Novel Associative Polymer Networks Based on Cyclodextrin Inclusion Compounds," *Macromolecules*, 38:3037-3040, 2005.

Liu, et al., "Bifunctional Multidentate Ligand Modified Highly Stable Water-Soluble," *Inorg. Chem.* 49:3768-3775, 2010.

Mazumder, et al., "Review: Biofunctionalized Quantum Dots in Biology and Medicine," *Journal of Nanomaterials*, vol. 2009, 17 pages, 2009.

Michalet, X., et al., "Quantum Dots for Live Cells, in Vivo Imaging, and Diagnostics," *Science*, 307(5709):538-544, Jan. 2005.

Pellegrino, Teresa, et al., "Hydrophobic Nanocrystals Coated with an Amphiphilic Polymer Shell: A General Route to Water Soluble Nanocrystals," *Nano Lett.*, 4 (4), pp. 703-707, Mar. 26, 2004.

Petruska, Melissa A., et al., "An Amphiphilic Approach to Nanocrystal Quantum Dot—Titania Nanocomposites," *J. Am. Chem. Soc.*, 2004, 126 (3), pp. 714-715, Dec. 25, 2003.

Pong, et al., "Modified Ligand-Exchange for Efficient Solubilization of CdSe/ZnS Quantum Dots in Water: A Procedure Guided by Computational Studies," *Langmuir* 24:5270-5276, 2008.

Zhou, Min, et al., "Peptide-Labeled Quantum Dots for Imaging GPCRs in Whole Cells and as Single Molecules," *Bioconjugate Chem.*, 18 (2), pp. 323-332, Jan. 17, 2007.

\* cited by examiner

POLYMER-CONJUGATED QUANTUM DOTS AND METHODS OF MAKING THE SAME

BACKGROUND

Quantum dots have generated an increasing interest because of their narrow and size-tunable emission spectra, broad absorption profiles, high quantum yields, and good chemical stability. One of the most promising applications of these luminescent quantum dots is served as an alternative fluorophore for molecular, cellular, and in vivo imaging. They have the potential to overcome many of the limitations encountered by conventional organic fluorophores and genetically engineered fluorescent proteins in a variety of biological applications. For biomedical applications, it is desirable to preserve the water dispersible and highly luminescent properties of the quantum dots. However, high-quality luminescent quantum dots are usually synthesized in organic media, and the resulting quantum dots capped with the native hydrophobic ligands (e.g., trioctylphosphine oxide, alkyl amines etc.) are not soluble in aqueous solutions.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

Some embodiments disclosed herein include a quantum dot including: an inorganic core; and a shell, wherein the shell comprises a polymer conjugated to the inorganic core, the polymer comprising a first monomer unit represented by formula I and a second monomer unit represented by formula II:

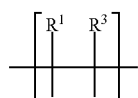
(I)

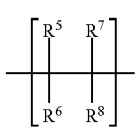
(II)

where $R^1$, $R^2$, $R^3$, and $R^4$ are each independently selected from hydrogen, $R^9$, $C_{1-6}$ alkyl, and $C_{1-6}$ alkyl substituted with one of more of $R^9$, provided that at least one of $R^1$, $R^2$, $R^3$, and $R^4$ is $R^9$ or $C_{1-6}$ alkyl substituted with one of more of $R^9$;

where each $R^9$ is independently represented by formula III:

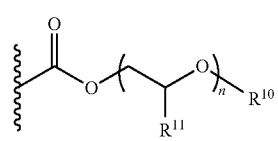
(III)

where $R^{10}$ is independently selected from hydrogen, $C_{1-6}$ alkyl, and $C_{1-6}$ alkyl substituted with one or more hydroxyl;

where each $R^{11}$ is independently selected from hydrogen, methyl, and combinations thereof;

where n is from 0 to 200;

where $R^5$, $R^6$, $R^7$, and $R^8$ are each independently selected from hydrogen, $R^{12}$, $C_{1-6}$ alkyl, and $C_{1-6}$ alkyl substituted with one of more of $R^{12}$, provided that at least one of $R^5$, $R^6$, $R^7$, and $R^8$ is $R^{12}$ or $C_{1-6}$ alkyl substituted with one of more of $R^{12}$;

where each $R^{12}$ is independently represented by formula IV:

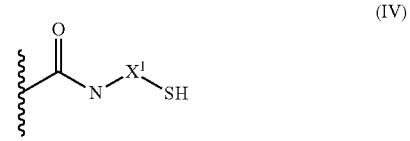
(IV)

where each $X^1$ is —$C_{1-6}$ alkylene-; and where the molar ratio of $R^9$ to $R^{12}$ substitutions in the polymer is in the range of about 94:6 to about 75:25.

Some embodiments disclosed herein include a method of making a water-soluble quantum dot including: conjugating an inorganic core with a polymer comprising a first monomer unit represented by formula I and a second monomer unit represented by formula II:

(I)

(II)

where $R^1$, $R^2$, $R^3$, and $R^4$ are each independently selected from hydrogen, $R^9$, $C_{1-6}$ alkyl, and $C_{1-6}$ alkyl substituted with one of more of $R^9$, provided that at least one of $R^1$, $R^2$, $R^3$, and $R^4$ is $R^9$ or $C_{1-6}$ alkyl substituted with one of more of $R^9$;

where each $R^9$ is independently represented by formula III:

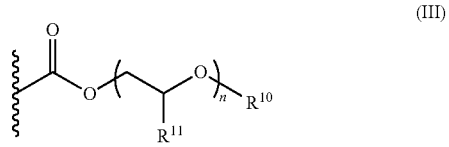
(III)

where $R^{10}$ is independently selected from hydrogen, $C_{1-6}$ alkyl, and $C_{1-6}$ alkyl substituted with one or more hydroxy;

where each $R^{11}$ is independently selected from hydrogen, methyl, and combinations thereof;

wherein n is from 0 to 200;

wherein $R^5$, $R^6$, $R^7$, and $R^8$ are each independently selected from hydrogen, $R^{12}$, $C_{1-6}$ alkyl, and $C_{1-6}$ alkyl substituted with one of more of $R^{12}$, provided that at least one of $R^5$, $R^6$, $R^7$, and $R^8$ is $R^{12}$ or $C_{1-6}$ alkyl substituted with one of more of $R^{12}$; and where each $R^{12}$ is independently represented by formula IV:

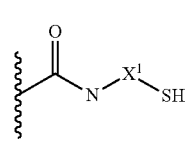

(IV)

where each $X^1$ is —$C_{1-6}$ alkylene-.

Some embodiments disclosed herein include exposing a composition including quantum dots to a radiation that is effective to produce luminescence.

Some embodiments disclosed herein include a method for detecting a component within a system, the method including: providing a quantum dot to the system, where the quantum dot includes one or more molecules conjugated to the polymer, where the molecules having affinity for the component; exposing the system to radiation that is effective to produce luminescence from the quantum dot; and measuring the intensity of radiation emitted by the quantum dots, wherein an increased intensity correlates with the presence of the component.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1:
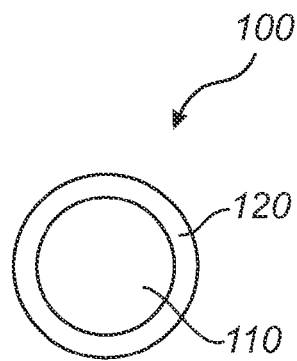
FIG. 1 depicts illustrative embodiments of a quantum dot that is within the scope of the present application (not to scale).

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Disclosed herein are quantum dots having an inorganic core and a shell. The shell may include, for example, a polymer that is conjugated to the inorganic core. The polymer may include a first monomer unit represented by Formula I and a second monomer unit represented by Formula II:

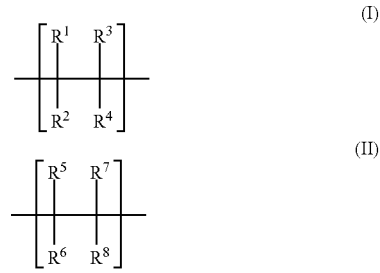

(I)

(II)

where $R^1$, $R^2$, $R^3$, $R^4$, $R^5$, $R^6$, $R^7$, and $R^8$ are defined further below. The quantum dots may, in some embodiments, be water-soluble and exhibit superior photoluminescence. Also disclosed are methods making and using the quantum dots.

DEFINITIONS

As used herein, "alkyl" refers to a straight or branched hydrocarbon chain that comprises a fully saturated (no double or triple bonds) hydrocarbon group. The alkyl group of the compounds may be designated as "$C_1$-$C_4$ alkyl" or similar designations. By way of example only, "$C_1$-$C_4$ alkyl" indicates that there are one to four carbon atoms in the alkyl chain, i.e., the alkyl chain is selected from methyl, ethyl, propyl, iso-propyl, n-butyl, iso-butyl, sec-butyl, and t-butyl. Typical alkyl groups include, but are in no way limited to, methyl, ethyl, propyl, isopropyl, butyl, isobutyl, tertiary butyl, pentyl, hexyl, and the like.

As used herein, "alkylene" refers to a straight or branched, fully saturated (no double or triple bonds) hydrocarbon tethering group that forms bonds to connect molecular fragments via their terminal carbon atoms. The alkylene group of the compounds may be designated as "—$C_1$-$C_4$ alkyl-" or similar designations. By way of example only, "—$C_1$-$C_4$ alkyl-" indicates that there are one to four carbon atoms in the alkylene chain. Examples of alkylene groups include but are not limited to methylene (—$CH_2$—), ethylene (—$CH_2CH_2$—), propylene (—$CH_2CH_2CH_2$—), dimethyl-methylene (—$CH(CH_3)_2$—), and butylene (—$CH_2CH_2CH_2CH_2$—).

As used herein, the term "hydroxyl" refers to a —OH group.

As used herein, "carboxyl" refers to "—C(=O)OH" group. As would be appreciated by the skilled artisan, a carboxyl group also includes its conjugate base.

As used herein, "substituted" refers to independent replacement of one, two, three, or more of the hydrogen atoms in the specified structure with a substituent. For example, methane substituted with one or more chlorines would include chloromethane, dichloromethane, trichloromethane, and carbon tetrachloride.

Polymer-Conjugated Quantum Dots

Some embodiments disclosed herein include quantum dots having an inorganic core and a shell. FIG. 1 shows one example of a quantum dot that is within the scope of the present application. Quantum dot 100 includes inorganic core 110 and shell 120 on the outer surface of inorganic core 110. In some embodiments, shell 120 includes a polymer conjugated to inorganic core 110.

Shell 120 may cover substantially all or all of the surface of inorganic core 110 as shown in FIG. 1. In some embodiments, the shell may cover only a portion of the surface of the inorganic core (not shown). In some embodiments, the shell covers a total surface area of the inorganic core sufficient for the quantum dot to be soluble in water (e.g., at least about 1 mg/L dissolves in water). The shell may cover, for example, at least about 50% of the inorganic core; at least about 75% of the inorganic core; at least about 90% of the inorganic core; at least about 95% of the inorganic core; at least about 98% for the inorganic core; at least about 99% of the inorganic core; or at least about 99.5% of the inorganic core.

Inorganic core 110 in the quantum dot is not particularly limited and can be selected based on the desired properties. In some embodiments, the inorganic core can be conjugated to a polymer in the shell. In some embodiments, the inorganic core includes a crystalline or semi-crystalline material.

The inorganic core can, in some embodiments, include a metal element. The metal element can be from main group II, subgroup VIIA, subgroup VIIIA, subgroup IB, subgroup IIB, main group III or main group IV of the periodic table. Non-limiting examples of these elements include gold, silver, copper, titanium, terbium, cobalt, platinum, rhodium, ruthenium, and lead. The inorganic core may include only a single metal (e.g., a pure metal), or an alloy of two, three, or more metals. The alloy may include any of the metals disclosed in the present application. For example, the inorganic core may include a ternary alloy having $Zn_xCd_{1-x}S$ and $Zn_xCd_{1-x}Se$, where $0<x<1$.

In some embodiments, the inorganic core can include a metal oxide. Non-limiting examples of metal oxides include silicon dioxide ($SiO_2$), aluminum oxide ($Al_2O_3$), titanium dioxide ($TiO_2$) and zirconium dioxide ($ZrO_2$).

In some embodiments, the inorganic core can include a semiconductor. The semiconductor may, for example, include a metal from main group II or subgroup IIB and an element from main group VI. As another example, the semiconductor may include a metal from main group III and an element from main group V. Examples of semiconductors include, but are not limited to, CdS, CdSe, CdTe, MgTe, ZnS, ZnSe, ZnTe, HgS, HgSe, HgTe, GaN, GaP, GaAs, GaSb, InN, InP, InAs, InSb, AlN, AlP, AlAs, and AlSb.

Figure 2A:
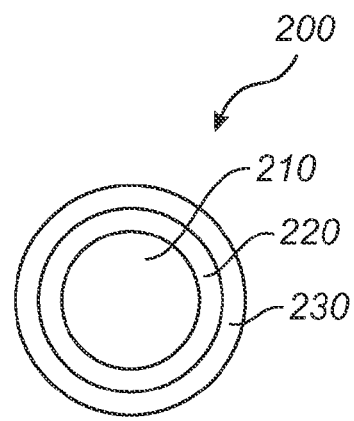
FIG. 2A shows an illustrative embodiment of a quantum dot having a core material and an inorganic shell (not to scale).

The inorganic core may optionally include a core material and one or more inorganic shells on the surface of the core. FIG. 2A shows an illustrative embodiment of a quantum dot having a core material and an inorganic shell. Quantum dot 200 includes core material 210 having inorganic shell 220 on the outer surface of core material 210. Shell 230 is on the surface of inorganic shell 220 and can include a polymer conjugated with the inorganic core.

Figure 2B:
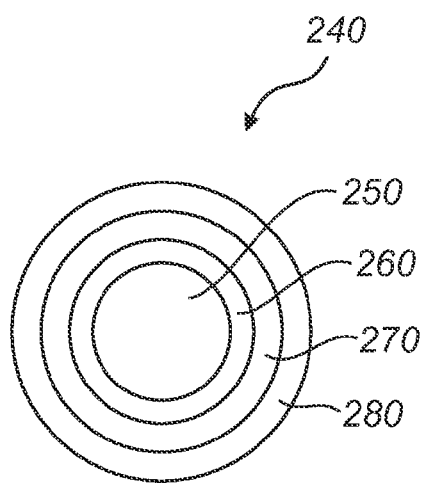
FIG. 2B shows an illustrative embodiment of a quantum dot having a core material and two inorganic shells (not to scale).

FIG. 2B shows an illustrative embodiments of quantum dot having a core material and two inorganic shells. Quantum dot 240 includes core material 250 having inorganic shell 260 on the outer surface of core material 250. Inorganic shell 270 is on the outer surface of inorganic shell 260. Shell 280 is on the surface of inorganic shell 260 and can include a polymer conjugated with the inorganic core.

When using a layered inorganic core (e.g., as depicted in FIGS. 2A and 2B), the core material can generally be any of those materials described above with respect to the inorganic core. In some embodiments, the core material has a high photoluminescent quantum yield (e.g., greater than about 50%). The core material can be, for example, CdSe or CdTe. Meanwhile, the one or more inorganic shells can also be any of those materials described above with respect to the inorganic core. In some embodiments, at least one of the inorganic shells exhibits a high bandgap. The bandgap can be, for example, at least about 2 eV; at least about 2.5 eV; at least about 3 eV; or at least about 3.5 eV. ZnS is one example of a material with a high bandgap that can be included in an inorganic shell. Non-limiting examples of materials for the one or more inorganic shells include ZnS, CdS, and CdSe.

When using a layered inorganic core with two or more inorganic layers (e.g., as depicted in FIG. 2B), the inorganic shell between the inorganic core and a second inorganic layer (e.g., inorganic core 270 depicted in FIG. 2B) may have a lattice constant between the lattice constants of the materials in the inorganic core and second inorganic layer. As an example, an inorganic shell having a lattice constant of 0.608 nm may be disposed between a core material having a lattice constant of 0.648 nm and a second inorganic layer having a lattice constant of 0.541.

Some examples of inorganic cores having a core/shell or core/shell/shell configuration include, but are not limited to, CdSe/ZnS, CdSe/CdS, CdTe/CdS, CdTe/CdS/ZnS, and CdTe/CdSe/ZnS.

The size of the inorganic core is also not particularly limited. The inorganic core may, for example, have an average diameter of no more than about 30 nm; no more than about 20 nm; no more than about 15 nm; or no more than about 10 nm. The inorganic core may, for example, have an average diameter of at least about 1 nm; at least about 2 nm; at least about 3 nm; at least about 5 nm; at least about 7 nm; at least about 10 nm; or at least about 15 nm. The inorganic core may also have a diameter between any of these values. For example, the inorganic core can have an average diameter of about 1 nm to about 15 nm.

The inorganic core may be prepared using standard methods known in the art. For example, the inorganic core may be prepared by injecting organometallic precursors into a hot coordinating solvent as described in U.S. Publication No. 2004/0033359.

Returning to FIG. 1, shell 120 can include a polymer conjugated to inorganic core 110. The polymer can, for example, include a first monomer unit represented by Formula I and a second monomer unit represent by Formula II:

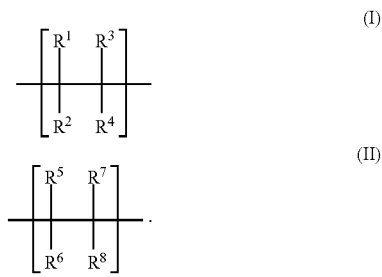

In some embodiments, $R^1$, $R^2$, $R^3$, and $R^4$ can each independently be selected from hydrogen, $R^9$, $C_{1-6}$ alkyl, and $C_{1-6}$ alkyl substituted with one of more of $R^9$. In some embodiments, $R^1$, $R^2$, $R^3$, and $R^4$ can each independently be selected from hydrogen, $R^9$, $C_{1-4}$ alkyl, and $C_{1-4}$ alkyl substituted with one of more of $R^9$. In some embodiments, $R^1$, $R^2$, $R^3$, and $R^4$ can each independently be selected from hydrogen, $R^9$, methyl, ethyl, —$CH_2$—$R^9$ and —$C_2H_4$—$R^9$.

In some embodiments, at least one of $R^1$, $R^2$, $R^3$, and $R^4$ is $R^9$ or $C_{1-6}$ alkyl substituted with one of more of $R^9$. In some embodiments, one of $R^1$, $R^2$, $R^3$, and $R^4$ is $R^9$ or $C_{1-6}$ alkyl substituted with one $R^9$.

In some embodiments, $R^1$ is hydrogen. In some embodiments, $R^2$ is hydrogen. In some embodiments, $R^3$ is hydrogen or methyl. In some embodiments, $R^4$ is $R^9$. In some embodiments, $R^4$ is carboxyl. In some embodiments, $R^1$ is hydrogen, $R^2$ is hydrogen, $R^3$ is hydrogen, and $R^4$ is $R^9$. In some embodiments, $R^1$ is hydrogen, $R^2$ is hydrogen, $R^3$ is methyl, and $R^4$ is $R^9$. In some embodiments, $R^1$ is hydrogen, $R^2$ is hydrogen, $R^3$ is hydrogen, and $R^4$ is carboxyl.

Each $R^9$ may independently be represented by Formula III:

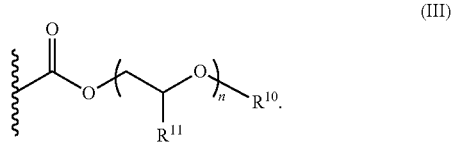

(III)

In some embodiments, $R^{10}$ is independently selected from hydrogen, $C_{1-6}$ alkyl, and $C_{1-6}$ alkyl substituted with one or more hydroxyl. In some embodiments, $R^{10}$ is independently selected from hydrogen, methyl, ethyl, —$CH_2$—OH, and —$C_2H_4$—OH. In some embodiments, $R^{10}$ is independently selected from hydrogen, methyl, and ethyl. In some embodiments, $R^{10}$ is hydrogen. In some embodiments, $R^9$ is carboxyl.

n is not particularly limited and may, for example, be in the range of 0 to 200. As some examples, n can be 0, about 5, about 10, about 15, about 20, about 25, about 50, about 100, about 150, about 200, or ranges between any two of these values. In some embodiments, n is 0.

Each $R^{11}$ can independently be selected from hydrogen and methyl. In some embodiments, $R^{11}$ can be hydrogen. In some embodiments, $R^{11}$ can be a combination of methyl and hydrogen groups. For example, if n is 10, five of the $R^{11}$ groups could be methyl and five of the $R^{11}$ groups could be hydrogen (i.e., equal amounts of ethylene oxide and propylene oxide units). In some embodiments, the recurring units containing the same $R^{11}$ group (e.g., methyl) are successively bonded together. For example, all five propylene oxide units may be successively bonded together followed by five ethylene oxide units.

The monomer unit represented by Formula I can be incorporated into the polymer by, for example, free radical polymerization of one or more vinyl-containing monomers. Non-limiting examples of vinyl-containing monomers that can be polymerized to form the first monomer unit include acrylic acid, methacrylic acid, itaconic acid, maleic acid, fumaric acid, crotonic acid, citraconic acid, polyethylene glycol acrylate, polyethylene glycol methacrylate, polypropylene glycol acrylate, and polypropylene glycol methacrylate. Many of these monomers are commercially available and can be polymerized using known methods, such as emulsion polymerization, solution polymerization, bulk polymerization, and suspension polymerization.

In some embodiments, $R^5$, $R^6$, $R^7$, and $R^8$ are each independently selected from hydrogen, $R^{12}$, $C_{1-6}$ alkyl, and $C_{1-6}$ alkyl substituted with one of more of $R^{12}$. In some embodiments, $R^5$, $R^6$, $R^7$, and $R^8$ can each independently be selected from hydrogen, $R^{12}$, $C_{1-4}$ alkyl, and $C_{1-4}$ alkyl substituted with one of more of $R^{12}$. In some embodiments, $R^5$, $R^6$, $R^7$, and $R^8$ can each independently be selected from hydrogen, $R^{12}$, methyl, ethyl, —$CH_2$—$R^{12}$ and —$C_2H_4$—$R^{12}$.

In some embodiments, at least one of $R^5$, $R^6$, $R^7$, and $R^8$ is $R^{12}$ or $C_{1-6}$ alkyl substituted with one of more of $R^{12}$. In some embodiments, one of $R^5$, $R^6$, $R^7$, and $R^8$ is $R^{12}$ or $C_{1-6}$ alkyl substituted with $R^{12}$.

In some embodiments, $R^5$ is hydrogen. In some embodiments, $R^6$ is hydrogen. In some embodiments, $R^7$ is hydrogen or methyl. In some embodiments, $R^8$ is $R^{12}$. In some embodiments, $R^5$ is hydrogen, $R^6$ is hydrogen, $R^7$ is hydrogen, and $R^8$ is $R^{12}$.

Each $R^{12}$ may be independently represented by Formula IV:

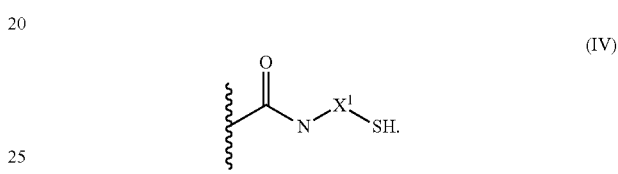

(IV)

In some embodiments, each $X^1$ is —$C_{1-6}$ alkylene-. In some embodiments, each $X^1$ is independently selected from methylene, ethylene, propylene, and butylene. In some embodiments, each $X^1$ is the same in the polymer. For example, each $X^1$ could be an ethylene.

In some embodiments, the polymer includes about 1 to about 10 monomer units represented by Formula II. In some embodiments, the polymer includes about 1 to about 10 monomer units that are substituted with $R^{12}$.

As discussed further below, the second monomer unit represented by Formula II can be incorporated in the polymer by coupling a mercaptoalkylamine with one or more carboxyl groups in the polymer. Thus, for example, a polymer containing the first monomer unit represented by Formula I (e.g., polyacrylic acid) can be reacted with a mercaptoethylamine using a carboxy-amine coupling reaction to form the second monomer unit represented by Formula II. The total amount of the second monomer unit represented by Formula II in the polymer may therefore be controlled by the relative amount of mercaptoalkylamine to polymer in the coupling reaction. Non-limiting examples of monomers that can be polymerized and coupled with a mercaptoalkylamine to form the second monomer unit include acrylic acid, methacrylic acid, itaconic acid, maleic acid, fumaric acid, crotonic acid, and citraconic acid.

Without being bound to any particular theory, it is believed the monomer unit represented by Formula II can be used to conjugate the polymer with the inorganic core: $R^{12}$ includes a thiol that may react to coordinate with the inorganic core (e.g., form a metal-sulfur bond). Meanwhile, the monomer unit represented by Formula I may impart solubility to the quantum dot by virtue, in part, of the polar $R^9$ group (e.g., carboxyl or alkylene oxide adduct) in this monomer. Thus, in some embodiments, the relative amount of $R^9$ to $R^{12}$ groups can be effective for the polymer to conjugate with the inorganic core and form a water-soluble quantum dot. In some embodiments, the molar ratio of $R^9$ to $R^{12}$ substitutions in the polymer can be in the range of about 94:6 to about 75:25. The molar ratio of $R^9$ to $R^{12}$ substitutions can be, for example, about 94:6, about 91:9, about 88:12, about 85:15, about 82:18, about 79:21, about 75:25, or any range between these values.

The molecular weight of the polymer in the shell is not particularly limited and can be varied depending upon the desired properties of the quantum dot. The weight average molecular weight can be, for example, at least about 500 Da, at least about 1,000 Da; at least about 1,500 Da; at least about 2,000 Da; or at least about 3,000 Da. The weight average molecular weight can be, for example, no more than about 1,000,000 Da; no more than about 100,000 Da; no more than about 10,000 Da; or no more than about 5,000 Da. The molecular weight can also be a range between any of these values. For example, the weight average molecular weight can be in the range of about 500 Da to about 1,000,000 Da.

In some embodiments, the polymer is a random copolymer. In some embodiments, the polymer is a block copolymer. For example, the polymer may can be diblock copolymer or a triblock copolymer.

The amount of the first monomer unit and the second monomer unit in the polymer can vary. In some embodiments, a total amount of the first monomer unit and the second monomer unit is at least about 90% by weight of the polymer. In some embodiments, a total amount of the first monomer unit and the second monomer unit is at least about 95% by weight of the polymer. In some embodiments, a total amount of the first monomer unit and the second monomer unit is at least about 98% by weight of the polymer. In some embodiments, a total amount of the first monomer unit and the second monomer unit is at least about 99% by weight of the polymer. In some embodiments, a total amount of the first monomer unit and the second monomer unit is at least about 99.5% by weight of the polymer. In some embodiments, the polymer consists of the first monomer unit and the second monomer unit.

The polymer may also include one or more other monomer units besides those represented by Formula I and II. The other monomer unit is not particularly limited to any structure and can include any monomer unit that can be polymerized, coupled, or otherwise reacted to incorporate within the polymer structure.

For example, the other monomer units can be those obtained by including different vinyl-containing monomers during polymerization. Non-limiting examples of other polymerizable monomers that may be used as appropriate for the polymer include sulfonic acid group-containing monomers (e.g., sodium vinylsulfonate), phosphoric acid group-containing monomers (e.g., 2-hydroxyethylacryloyl phosphate), cyano group-containing monomers (e.g., acrylonitrile or methacrylonitrile), vinyl esters (e.g., methyl vinyl ether and ethyl vinyl ether), and aromatic vinyl compounds (e.g., styrene). As another example, the polymer can include other monomers that result from coupling different compounds with the monomer. For example, 1-amino-4-mercapto-benzene may be coupled with a carboxyl-containing monomer unit (e.g., acrylic acid).

The amount of the other monomer units can be, for example, no more than about 20% by weight; no more than about 10% by weight; no more than about 5% by weight; no more than about 2% by weight; no more than about 1% by weight; or no more than about 0.5% by weight. In some embodiments, the polymer does not include other monomer units.

In some embodiments, the polymer is water soluble. The skilled artisan, guided by the teachings of the present application, can readily determine whether a polymer a structure is water soluble. Generally, the solubility of the polymer will increase with higher relative amounts of polar groups in the polymer. For example, increasing the amount carboxyl groups in the polymer will generally increase solubility. The polymer can, for example, have a solubility in water of at least about 100 mg/L; at least about 1 mg/mL; at least about 10 mg/mL; at least about 100 mg/mL; or at least about 500 mg/mL.

The thickness of the shell in the aqueous environment may vary. In some embodiments, the shell has a hydrodynamic thickness of no more than about 20 nm. In some embodiments, the shell has a hydrodynamic thickness of no more than about 15 nm. In some embodiments, the shell has a hydrodynamic thickness of no more than about 10 nm. In some embodiments, the shell has a hydrodynamic thickness of no more than about 5 nm. In some embodiments, the shell has a hydrodynamic thickness of no more than about 4 nm. In some embodiments, the shell has a hydrodynamic thickness of no more than about 3 nm.

The quantum dots, in some embodiments, may provide enhanced luminescence intensity after long time periods in aqueous solution relative to quantum dots without the conjugated polymer. In some embodiments, the quantum dot maintains at least about 80% luminescence intensity when dispersed in aqueous solution for at least about 5 day. In some embodiments, the quantum dot maintains at least about 80% luminescence intensity when dispersed in aqueous solution for at least about 10 days. In some embodiments, the quantum dot maintains at least about 80% luminescence intensity when dispersed in aqueous solution for at least about 20 days. In some embodiments, the quantum dot maintains at least about 80% luminescence intensity when dispersed in aqueous solution for at least about 30 days. In some embodiments, the quantum dot maintains at least about 90% luminescence intensity when dispersed in aqueous solution for at least about 10 days. In some embodiments, the quantum dot maintains at least about 90% luminescence intensity when dispersed in aqueous solution for at least about 20 days. In some embodiments, the quantum dot maintains at least about 90% luminescence intensity when dispersed in aqueous solution for at least about 30 days. The pH for the aqueous solution can be, for example about 3, about 4, about 7, about 12, about 14, or any range between these values.

The quantum dots, in some embodiments, may provide superior luminescence intensity in aqueous electrolyte solutions. In some embodiments, the quantum dots maintain at least about 90% luminescence intensity in an aqueous solution of NaCl. In some embodiments, the quantum dots maintain at least about 95% luminescence intensity in an aqueous solution of NaCl. The aqueous solution of NaCl may, for example, have about 1 M NaCl, about 2 M NaCl, about 3 M NaCl, about 4 M NaCl, about 5 M NaCl, or any range between these values.

In some embodiments, the polymer can be conjugated to a molecule having binding activity for a particular component or target. A suitable coupling agent may, for example, be used to couple the molecule having binding activity. In some embodiments, the molecule having binding activity is a biomolecule. Non-limiting example of biomolecules that may conjugated with the quantum dots include glycoproteins, transferrin, adenine, antibodies, ligands, receptors, streptavidin, actinomyosin, antiotensin, and nucleic acids.

Method of Making Polymer-Conjugated Quantum Dots

Some embodiment disclosed herein include conjugating an inorganic core and a polymer including a first monomer unit represented by Formula I and a second monomer unit represented by Formula II. The polymer and inorganic core can be any of those disclosed in the present application.

The polymer may be conjugated to the inorganic core using conventional ligand exchange procedures. As one example, Pong, B et al, *Langmuir* (2008) 24:5270 discloses one possible method for conjugating thiol-containing compounds with an inorganic core.

In some embodiments, the polymer may be conjugated using a ligand exchange to coordinate the capping reagent with the inorganic core. For example, the polymer may be combined with the inorganic core and an organic solvent. The reaction may occur under basic conditions using, for example, an organic base such as tetramethylammonium hydroxide pentahydrate (TMAH). The resulting quantum dots may then be isolated from the solution.

As one specific example, the inorganic core may be dispersed in chloroform and the polymer may be combined with TMAH and 1:4 parts by volume of ethanol and methylene chloride. The polymer solution may be added dropwise to the inorganic core solution. The resulting quantum dots can be isolated using a solvent exchange followed by centrifugation.

Suitable solvents for the process include polar solvents, such as water, pyridine, dimethylformamide (DMF), DMSO, dichloromethane, ether, chloroform, or tetrahydrofuran.

In some embodiments, the method can include forming the polymer including a first monomer unit represented by Formula I and a second monomer unit represented by Formula II. The polymer can be formed, for example, by coupling a mercaptoalkylamine with an existing polymer. The existing polymer and mercaptoalkylamine may be combined in a solvent with a suitable coupling reagent. As one specific example, polyacrylic acid may be coupled mercaptoethylamine by combining these components with dicyclohexylcarbodiimide and 1-methyl-2-pyrrolidone.

Suitable coupling reagents include carbodiimides, such as dicyclohexylcarbodiimide (DCC) diisopropylcarbodiimide (DIC), and ethyl-(N',N'-dimethylamino)propylcarbodiimide hydrochloride (EDC).

The existing polymer that may be used in the coupling reaction can be selected based on the desired structure of the final polymer. In some embodiments, the existing polymer includes monomer units represented by Formula I. The existing polymer can be a homopolymer or copolymer. In some embodiments, the existing polymer consists of monomer units represented by Formula I.

The amount of the monomer units represented by Formula I in the existing polymer can be, for example, at least about 40% by weight; at least about 50% by weight; at least about 60% by weight; at least about 70% by weight; at least about 80% by weight; at least about 90% by weight; at least about 95% by weight; at least about 98% by weight; at least about 99% by weight; or at least about 99.5% by weight.

Non-limiting examples of polymers that can be coupled with the mercaptoalkylamine include polyacrylic acid, polymethacrylic acid, poly(acrylic acid-co-methacrylic acid), polyacrylic acid ethylene oxide adduct, poly(acrylic acid-co-2-hydroxyl-ethyl acrylate), and the like.

As discussed above, the total amount of the second monomer unit represented by Formula II in the polymer may relate to the ratio of mercaptoalkylamine to the existing polymer in the coupling reaction. Thus, the skilled artisan, guided by the teachings of the present application, can select an appropriate relative amount of mercaptoalkylamine and existing polymer to achieve the desired proportion of monomer units represent by Formula II in the polymer. In some embodiments, the relative amount of mercaptoalkylamine and existing polymer is effective to produce a polymer having a molar ratio of $R^9$ to $R^{12}$ substitutions in the polymer in the range of about 94:6 to about 75:25. The molar ratio of $R^9$ to $R^{12}$ substitutions can be, for example, about 94:6, about 91:9, about 88:12, about 85:15, about 82:18, about 79:21, about 75:25, or any range between these values.

In some embodiments, the mercaptoalkylamine is a compound represented by Formula V:

(V)

where X is —$C_{1-6}$ alkylene-. Examples of $X^2$ include, but are not limited to, methylene, ethylene, propylene, butylene, pentylene, hexylene, and combinations thereof. The compound represented by Formula V can be, for example, mercaptomethylamine, mercaptoethylamine, mercaptopropylamine, mercaptobutylamine, mercaptopentylamine, mercaptohexylamine, and combinations thereof.

Without being bound to any particular theory, it is believed that some of the methods disclosed herein can be advantageous because they include coupling mercaptoalkylamine with the polymer before conjugating the polymer with the inorganic core. In contrast, it is possible to first conjugate the mercaptoalkylamine with the inorganic core and subsequently couple the conjugated mercaptoalkylamine with the polymer. It is believed the latter procedure cannot easily control the total amount of coupling reactions in the polymer (e.g., the molar ratio of $R^9$ to $R^{12}$ substitutions in the polymer). Moreover, the latter process can result in an excess amount of mercaptoalkylamine conjugated to the inorganic core, which may reduce fluorescence of the quantum dot.

Accordingly, in some embodiments, the method does not include conjugating the quantum dot with a compound represented by Formula V. Rather, for example, the inorganic core is conjugated with a polymer that was previously coupled with the mercaptoalkylamine (e.g., a polymer having the first monomer unit represented by Formula I and a second monomer unit represented by Formula II). In some embodiments, the inorganic core is conjugated with a polymer that includes $R^{12}$ before conjugating with the inorganic core.

Method of Using Polymer-Conjugated Quantum Dots

Some embodiments disclosed herein include a method of producing light. The method can include exposing a composition having quantum dots to a radiation that is effective to produce luminescence. The quantum dot can be any of those disclosed in the present application. In some embodiments, the method further comprises detecting the luminescence from the quantum dot. In some embodiment, the method further comprises detecting the luminescence intensity produced from the quantum dot and correlating the luminescence intensity with a concentration of quantum dots in the composition.

The type of radiation exposed to the quantum dots can vary depending upon the materials and structure of the quantum dot. In some embodiments, the quantum dots are exposed to blue or ultraviolet radiation. In some embodiments, the blue or ultraviolet radiation is in the range of about 350 to about 450 nm.

Some embodiments disclosed herein include a method for detecting a component within a system, the method can include: providing a quantum dot to the system, where one or more molecules are conjugated to the polymer; exposing the system to radiation that is effective to produce luminescence from the quantum dot; and measuring the intensity of radiation emitted by the quantum dots. The quantum dot can be any of those disclosed in the present application.

Various the method may be used for various types of systems. In some embodiments, the system is a biological system. The biological system can be in vivo or in vitro. In some embodiments, the system can be a fluid, such a drinking water or breathable air. The method can be used, for example, to detect pathogens in the fluid.

The one or more molecules conjugated to the polymer can have an affinity (e.g., binding affinity) for the component that is sought to be detected. Various types of molecules are known in the art. In some embodiments, the molecule is an antibody having affinity for an antigen. In some embodiments, the molecule is a ligand having affinity for a receptor (e.g., a receptor on a cell). In some embodiments, the molecule is a receptor having affinity for a ligand. In some embodiments, the molecule is a nucleic having affinity (e.g., hybridizes) for a different nucleic acid (e.g., a nucleic acid with a complementary sequence). In some embodiments, the molecule conjugated to the polymer is a biomolecule.

Without being bound to any particular theory, it is believe the quantum dots will preferentially locate near the regions with higher amounts of the component. This may be due to the conjugated molecules' affinity for the component. Accordingly, in some embodiments, regions exhibiting increased luminescence intensity can be correlated with higher concentrations of the component.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

EXAMPLES

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Example 1

Preparing Inorganic Core

Synthesis of CdSe Core Quantum Dots.

CdSe core nanocrystals were prepared via a modified literature method (Qu, L.; Peng, X. J. Am. Chem. Soc., 2002, 124, 2049). Typically, 25.6 mg (0.2 mmol) of CdO, 1.2 g of trioctylphosphine oxide (TOPO), 1.0 ml of oleic acid and 4.0 ml of octadecene (ODE) were loaded in a 50 mL three-neck flask clamped in a heating mantle. The mixture was heated to 320-330° C. under argon flow and resulted in a colorless clear solution, which was then cooled to 315° C. At this temperature, 2.4 mL of the Se precursor solution, which was made by dissolving selenium (79.0 mg) in TOPO (4.0 ml) and ODE (6.0 ml) by sonication, was quickly injected into the reaction flask. After the injection, the reaction temperature was set at ~270° C. for the growth of the nanocrystals with different periods of time (10 s-3 min) to get nanocrystals with desired size. The reaction mixture was then allowed to cooled to ~60° C. and 10.0 mL of hexane/$CH_3OH$ (v/v, 1:1) was used as the extraction solvent to separate the nanocrystals from byproducts and unreacted precursors. The as-prepared CdSe solution was further purification by centrifugation and decantation with the addition of acetone.

Stock Solutions Preparation.

The Zn precursor solution (0.1 M) was prepared by dissolving 219.5 mg (1 mmol) $Zn(OAc)_2.2H_2O$ in 10.0 mL ODE at 160° C. The sulfur precursor solution (0.1 M) was obtained by dissolving sulfur in ODE at 120° C. The Cd precursor solution (0.1 M) was prepared by dissolving 128.4 mg (1 mmol) CdO in 2.0 ml oleic acid and 8.0 mL ODE at 160° C. Each stock solution was stored at room temperature.

Synthesis of CdSe/Cds/ZnS Core/Shell/Shell Quantum Dots.

The successive ion layer adsorption and reaction (SILAR) technique was adopted for the growth of CdSe/CdS/ZnS core/shell/shell nanocrystals ((a) Li, J. J.; Wang, Y. A.; Guo, W.; Keay, J. C.; Mishima, T. D.; Johnson M. B.; Peng, X. J. Am. Chem. Soc., 2003, 125, 12567. (b) Xie, R.; Kolb, U.; Li, J.; Basche T.; Mews, A. J. Am. Chem. Soc., 2005, 127, 7480.). In a typical procedure, a chloroform solution of purified 3.5 nm CdSe quantum dots containing 0.1 mmol of CdSe, 1.0 mL of oleylamine and 4.0 mL of ODE were loaded in a 50 mL flask. The flask was then pumped down at room temperature for 20 min to remove the chloroform and at 100° C. for another 20 min while flushing the reaction system twice with a flow of argon. Subsequently, the reaction mixture was further heated to 230° C. for the overgrowth of the CdS shell. The Cd precursor stock solution was added into the reaction flask, after 10 min when the Cd precursor was fully deposited around the CdSe surface, an equimolar amount of S precursor stock solution was added into the reaction system. When the first monolayer of CdS was deposited around the CdSe cores, another Cd/S precursor solution was added alternately at approximately 10 min intervals. The volume of the precursor stock solution added in each cycle was the amount needed for a whole monolayer of CdS shell. The amount was calculated from the respective volumes of concentric spherical shells with 0.35 nm thickness for one monolayer (ML) of CdS (e.g. 0.7, 1.0, 1.3 mL for the 1st, 2nd, and 3rd ML, respectively). Then the reaction temperature was set at 200° C. for the overgrowth of ZnS shell. The Zn/S precursor stock solution was added into the reaction flask at intervals of 20 min. To monitor the reaction, aliquots were taken before a new cycle of injection and their corresponding UV-vis and PL spectra were recorded. The reaction was terminated by allowing the reaction mixture to cool down to room temperature. The purification procedure was similar to that for CdSe core nanocrystals.

Example 2

Coupling Existing Polymer

The coupled polymer was synthesized to obtain a nominal 15% grafting percentage of polyacrylic acid (PAA) (that is, 15% of the carboxylic acid groups are nominally modified with mercaptoethylamine (MEA) portion), dried PAA powder (4.5 g, 62.5 mmol based on —COOH group) was dissolved in 150 mL of MPD at 60° C. for 24 h. Then, the solutions of dried MEA (1.1 g, 9.4 mmol) dissolved in 15.0 mL of MPD and 2.2 g (10.5 mmol) of dicyclohexylcarbodiimide (DCC) dissolved in 10.0 mL of 1-methyl-2-pyrrolidione (MPD) were introduced into the PAA solution under vigorous stirring. After a reaction for 72 h at 60° C. to give a bifunctional grafted PAA polymer with 15% of the carboxylic acid functional groups modified with 2-mercaptoethylamine (MEA) portion, the system was cooled to room temperature, centrifuged, and the precipitation was discarded, followed by addition of 100 mL of 40 wt % NaOH solution to precipitate the polymer. The precipitate was washed three times with 50 mL of hot MPD (60° C.) and then with 60 mL of methanol at room temperature. After filtration, the solid product was dissolved in 10 mL of water at 30° C., and precipitated in 100 mL of methanol (two times). The product was exposed to the air for 30 min, and then dissolved into 10 mL of water. The final dry product (4.7 g with yield of 86% based on MEA) was obtained by freeze-drying. Each polymer molecule contained approximately 3.6 thiol groups as determined by NMR measurement.

Example 3

Conjugating Polymer with Inorganic Core

The initial oil-soluble CdSe/CdS/ZnS quantum dots were prepared according to Example 1. 120 mg of tetramethylammonium hydroxide pentahydrate (TMAH) was mixed well with the polymer prepared according to Example 2 (50 mg) in a solution of ethanol (0.4 mL) and $CHCl_3$ (1.6 mL), and the resulting pH of the solution was about 10. Then this solution was added dropwise into a solution of purified quantum dots prepared according to Example 1 in chloroform (5.0 mL of 1 mg/mL solution) with vigorous stirring for 20 min. Subsequently, deionized water was added into the solution. The quantum dots were found to be successfully transferred from the chloroform phase in the bottom to the water phase on the top. The underlying organic phase was discarded, and the aqueous phase containing the quantum dots was collected. The excess amount of free polymer was removed by centrifugation. The supernatant was discarded and the pellet was then redissolved in water, and this centrifugation-decantation cycle was repeated twice to get the purified quantum dot aqueous solution.

Comparative Example 1

Mercaptopropionic Acid-Conjugated Quantum Dots

Mercaptopropionic acid-conjugated quantum dots were prepared according to the method described in Pong, B et al. Langmuir 2008, 24, 5270.

Example 4

Dynamic Light Scattering

Quantum dots prepared according to Example 3 and Comparative Example 1 were studied using dynamic light scattering. Dynamic light scattering analysis in aqueous solution was conducted with a Zeta Sizer nano series laser light scattering system (Malvern Instrument Corporation). The average hydrodynamic diameter for polymer-conjugated quantum dots was about 12.9 nm, while the average diameter for the mercaptopropionic acid-conjugated quantum dots was about 7.8 nm.

Example 5 pH Sensitivity Study

100 μL of concentrated purified quantum dots in aqueous solution was added and mixed well in a 5.0 mL buffer solution with different pH values (different pH values were obtained with the addition of HCl or NaOH solution to the 50 mM phosphate buffer with initial pH of 7.0). The obtained quantum solutions with various pH values were sealed and stored in the dark, and their photoluminescence spectra was monitored over time.

The pH value of a solution was measured by a PHS-3C pH meter. Photoluminescence spectra were obtained on a Cary Eclipse (Varian) fluorescence spectrophotometer, respectively. Excitation wavelengths were set at the first absorption peak of the quantum dot samples (determined from the UV-vis spectra).

Figure 3A:
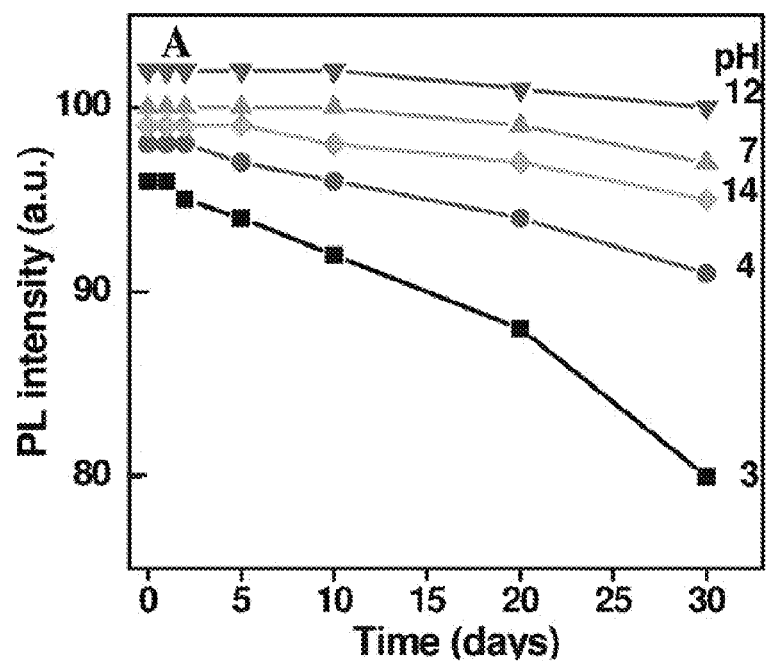
FIG. 3A shows the photoluminescence quantum yield for the polymer-conjugated quantum dots over 30 days at varying pHs.
Figure 3B:
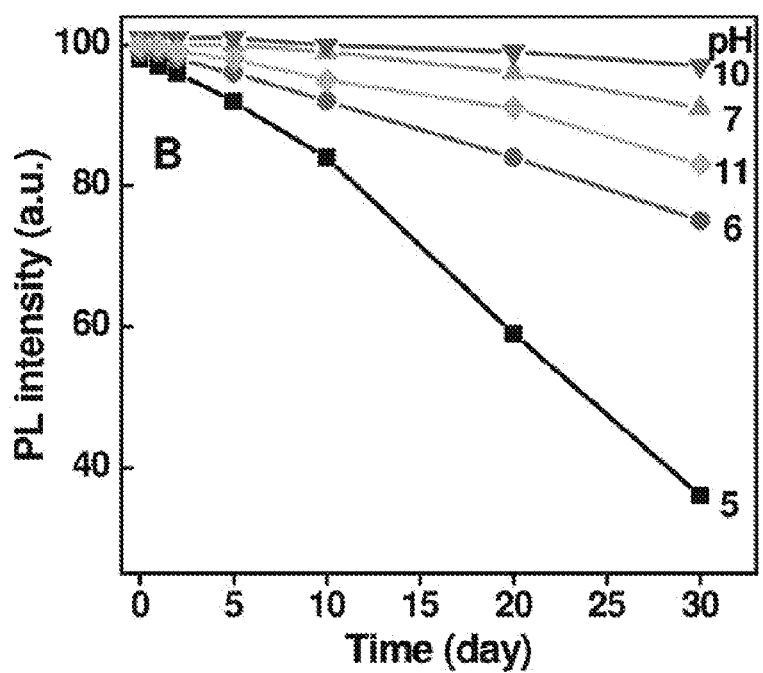
FIG. 3B shows the photoluminescence quantum yield for the mercaptopropionic acid-conjugated quantum dots over 30 days at varying pHs.

FIG. 3A shows the photoluminescence quantum yield for the polymer-conjugated quantum dots over 30 days at varying pHs. FIG. 3B shows the photoluminescence quantum yield for the mercaptopropionic acid-conjugated quantum dots over 30 days at varying pHs. The results demonstrate that the polymer-conjugated quantum dots exhibit superior quantum yields in the pH range of 3-14. These results indicate the polymer-conjugated quantum dots are more tolerant of different pH conditions.

Example 6

Electrolyte Sensitivity Study

The use of quantum dots in certain schemes may require that they exhibit long-term stability in solutions that span a wide range of electrolyte concentrations. A series of NaCl solutions with concentration ranging from 0 to 5.0 M (nearly saturated concentration) were prepared. A 100 μL concentrated purified quantum dot aqueous solution was added to a 5.0 mL NaCl solution with a specific concentration and mixed well for the measurement of optical spectra. The photoluminescence quantum yield was determine using generally the same procedures as Example 5. UV-vis spectra were obtained on a Shimadzu UV-2450 spectrophotometer.

Figure 4:
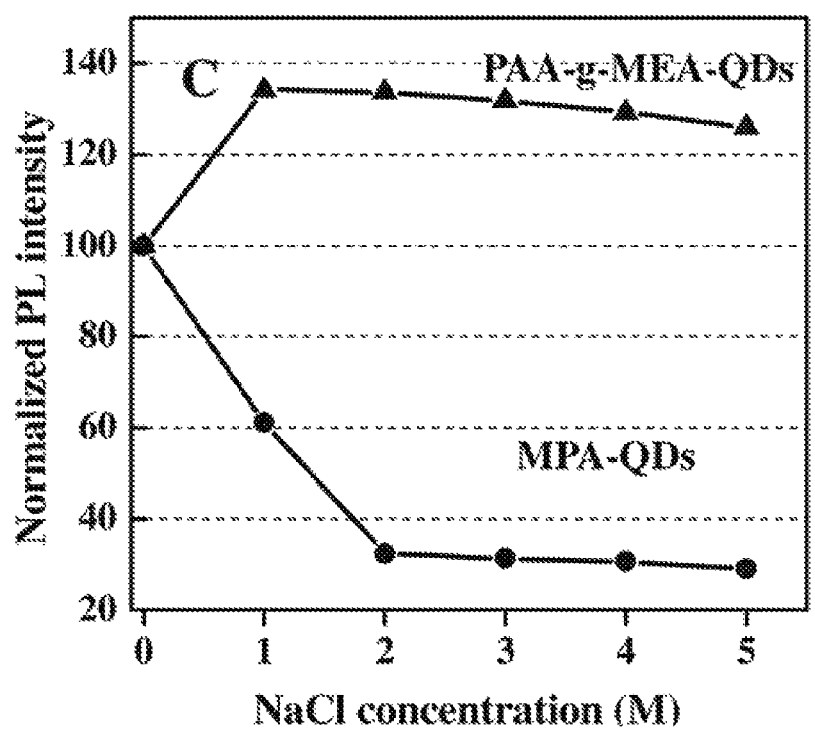
FIG. 4 shows the photoluminescence quantum yield for the polymer-conjugated quantum dots (PAA-g-MEA-QD) and the mercaptopropionic acid-conjugated quantum dots (MPA-QD) at varying NaCl concentrations.

FIG. 4 shows the photoluminescence quantum yield for the polymer-conjugated quantum dots and the mercaptopropionic acid-conjugated quantum dots at the varying NaCl concentrations. The polymer-conjugated quantum dots exhibited an about 23-25% increase in yield at 1-5 M NaCl, while the mercaptopropionic acid-conjugated quantum dots exhibited a significant decrease. These results suggest the polymer-conjugated quantum dots are stable in varying salt concentrations.

Figure 5A:
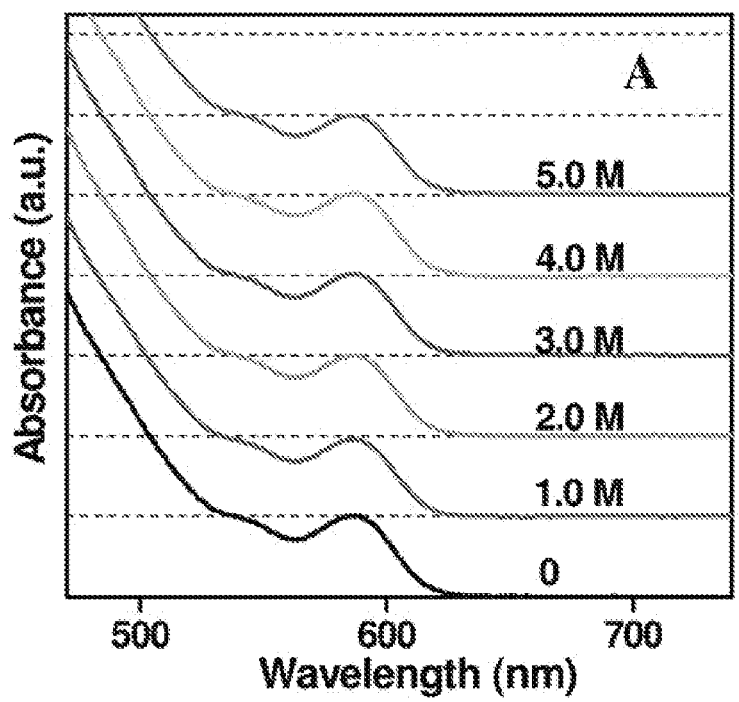
FIGS. 5A & 5B show the UV-vis absorption of the polymer-conjugated quantum dots and the mercaptopropionic acid-conjugated quantum dots, respectively, at varying NaCl concentrations.
Figure 5B:
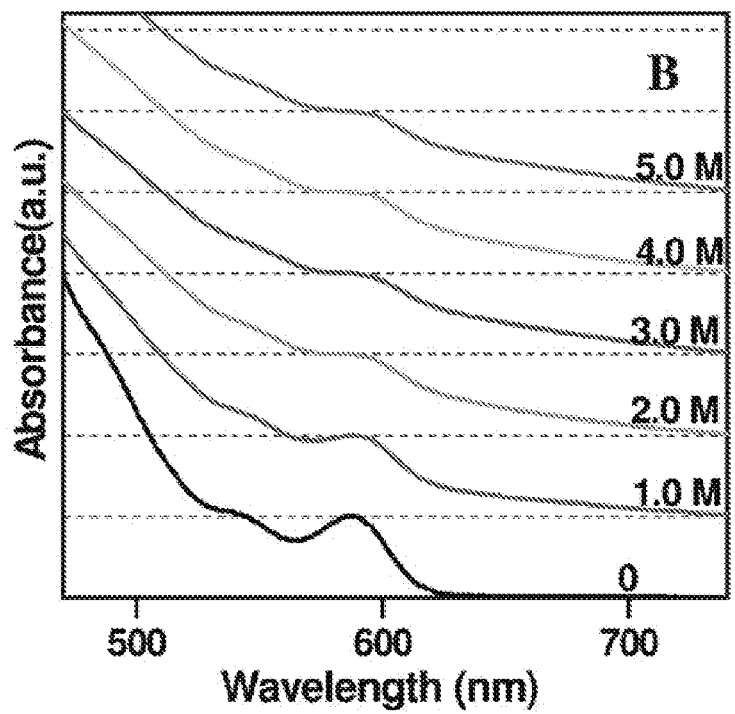

FIGS. 5A & 5B show the UV-vis absorption of the polymer-conjugated quantum dots and the mercaptopropionic acid-conjugated quantum dots, respectively. The mercaptopropionic acid-conjugated quantum dots exhibit an absorption tail at longer wavelengths, which indicates the quantum dots were aggregating. In contrast, the polymer-conjugated quantum dots did not exhibit any tail, which suggest the quantum dots remained dispersed in the electrolyte solution.

Example 7

Thermal Stability

The purified polymer-conjugated quantum dots and the mercaptopropionic acid-conjugated quantum dots were loaded in a closed container and heated from room temperature to 100° C. in a period of 10 min. and kept at this temperature for a certain period. Aliquots were taken, and their corresponding optical spectrum was measure over time. Timing started when the temperature reached 100° C. The spectrum was obtained using generally the same procedures in Example 5.

Figure 6:
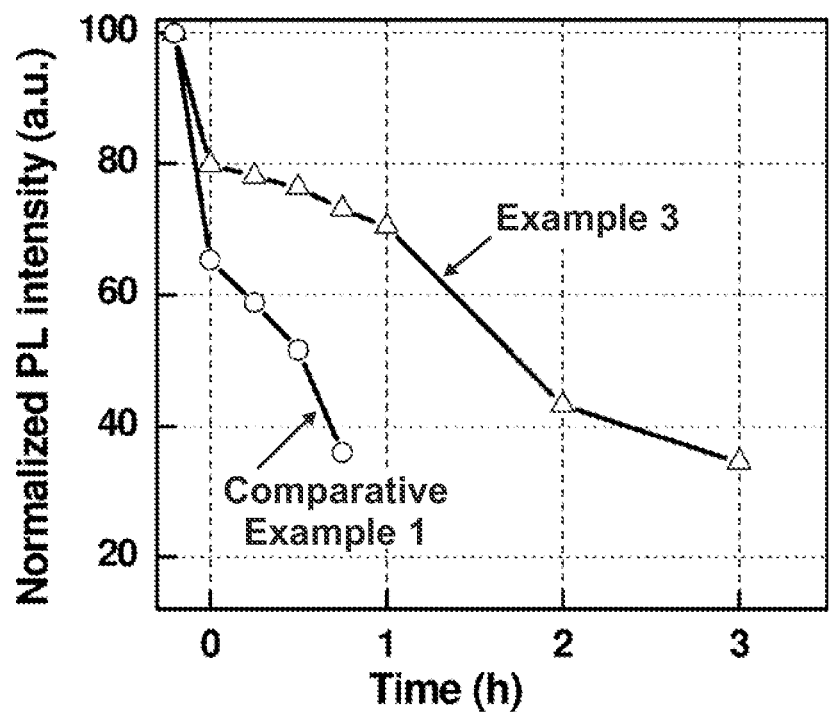
FIG. 6 shows the photoluminescence quantum yield for the polymer-conjugated quantum dots and the mercaptopropionic acid-conjugated quantum dots over 3 hours at 100° C.

FIG. 6 shows the photoluminescence quantum yield for the polymer-conjugated quantum dots and mercaptopropionic acid-conjugated quantum dots over 3 hours at 100° C. The mercaptopropionic acid-conjugated quantum dots exhibit an about 65% decrease in less than one hour. These quantum dots also aggregated and precipitated making further measurements too difficult. In contrast, the polymer-conjugated quantum dots were more stable at elevated temperatures and exhibited a slower decline in yield.

What is claimed is:

1. A quantum dot comprising:
an inorganic core; and a shell, wherein the shell comprises a polymer conjugated to the inorganic core, the polymer comprising a first monomer unit represented by formula I and a second monomer unit represented by formula II:

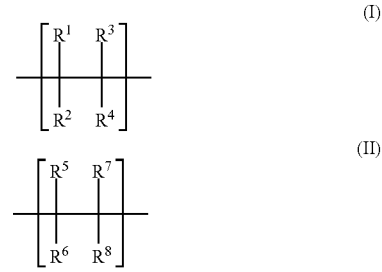

wherein $R^1$, $R^2$, $R^3$, and $R^4$ are each independently selected from the group consisting of hydrogen, $R^9$, $C_{1-6}$ alkyl, and $C_{1-6}$ alkyl substituted with one or more of $R^9$, provided that at least one of $R^1$, $R^2$, $R^3$, and $R^4$ is $R^9$ or $C_{1-6}$ alkyl substituted with one of or more of $R^9$;

wherein each $R^9$ is independently represented by formula III:

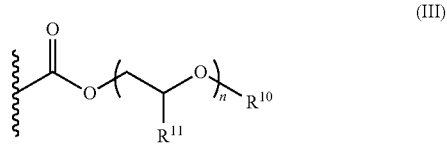

wherein $R^{10}$ is independently selected from the group consisting of hydrogen, $C_{1-6}$ alkyl, and $C_{1-6}$ alkyl substituted with one or more hydroxyl;

wherein each $R^{11}$ is independently selected from the group consisting of hydrogen, methyl, and combinations thereof;

wherein n is from 0 to 200;

wherein $R^5$, $R^6$, $R^7$, and $R^8$ are each independently selected from the group consisting of hydrogen, $R^{12}$, $C_{1-6}$ alkyl, and $C_{1-6}$ alkyl substituted with one or more of $R^{12}$, provided that at least one of $R^5$, $R^6$, $R^7$, and $R^8$ is $R^{12}$ or $C_{1-6}$ alkyl substituted with one or more of $R^{12}$;

wherein each $R^{12}$ is independently represented by formula IV:

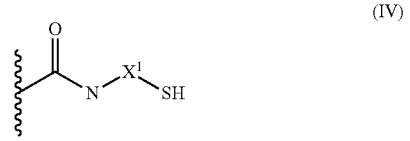

wherein each $X^1$ is —$C_{1-6}$ alkylene-; and wherein the molar ratio of $R^9$ to $R^{12}$ substitutions in the polymer is in the range of about 94:6 to about 75:25.

2. The quantum dot of claim 1, wherein the polymer is water-soluble.

3. The quantum dot of claim 1, wherein n is 0 and $R^{10}$ is hydrogen.

4. The quantum dot of claim 1, $R^1$, $R^2$, $R^3$, $R^5$, $R^6$, and $R^7$ are hydrogen.

5. The quantum dot of claim 1, wherein $X^1$ is ethylene.

6. The quantum dot of claim 1, wherein the polymer comprises about 1 to about 10 monomer units that are substituted with $R^{12}$.

7. The quantum dot of claim 1, wherein the polymer has a weight average molecular weight of at least about 500 Da.

8. The quantum dot of claim 1, wherein the polymer comprises at least about 90% by mole of a combined amount of the first monomer unit and the second monomer unit.

9. The quantum dot of claim 1, wherein the inorganic core comprises an element selected from the group consisting of Cd, Se, S, Te, Zn, and combinations thereof.

10. The quantum dot of claim 1, wherein the inorganic core comprises an inner core and one or more outer layers, the inner core comprising a inorganic material that is luminescent, and the one or more outer layers comprising a inorganic material that exhibits a high bandgap.

11. The quantum dot of claim 1, wherein the inorganic core has a diameter less than about 30 nm.

12. The quantum dot of claim 1, wherein the shell has a hydrodynamic thickness of less than or equal to about 20 nm.

13. The quantum dot of claim 1, wherein the quantum dot maintains at least 80% luminescence intensity when dispersed in aqueous solution for about 5 days.

14. A method of making a quantum dot of claim 1 comprising:

conjugating an inorganic core with a polymer comprising a first monomer unit represented by formula I and a second monomer unit represented by formula II:

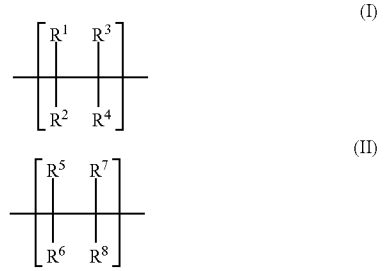

wherein $R^1$, $R^2$, $R^3$, and $R^4$ are each independently selected from the group consisting of hydrogen, $R^9$, $C_{1-6}$ alkyl, and $C_{1-6}$ alkyl substituted with one or more of $R^9$, provided that at least one of $R^1$, $R^2$, $R^3$, and $R^4$ is $R^9$ or $C_{1-6}$ alkyl substituted with one or more of $R^9$;

wherein each $R^9$ is independently represented by formula III:

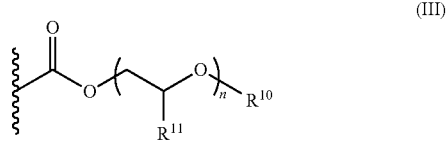

wherein $R^{10}$ is independently selected from the group consisting of hydrogen, $C_{1-6}$ alkyl, and $C_{1-6}$ alkyl substituted with one or more hydroxy;

wherein each $R^{11}$ is independently selected from the group consisting of hydrogen, methyl, and combinations thereof;

wherein n is from 0 to 200;

wherein $R^5$, $R^6$, $R^7$, and $R^8$ are each independently selected from the group consisting of hydrogen, $R^{12}$, $C_{1-6}$ alkyl, and $C_{1-6}$ alkyl substituted with one or more of $R^{12}$, provided that at least one of $R^5$, $R^6$, $R^7$, and $R^8$ is $R^{12}$ or $C_{1-6}$ alkyl substituted with one or more of $R^{12}$; and wherein each $R^{12}$ is independently represented by formula IV:

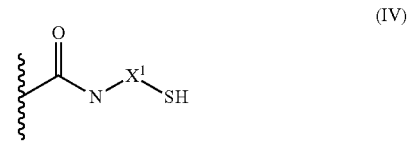

wherein each $X^1$ is —$C_{1-6}$ alkylene-.

15. The method of claim 14, wherein the molar ratio of $R^9$ to $R^{12}$ substitutions in the polymer is in the range of about 94:6 to about 75:25.

16. The method of claim 14, wherein the polymer comprises $R^{12}$ before conjugating with the quantum dot.

17. The method of claim 14, wherein the method does not include conjugating the quantum dot with a compound represented by formula V:

wherein $X^2$ is —$C_{1-6}$ alkylene-.

18. A method comprising exposing a composition comprising the quantum dot of claim 1 to a radiation that is effective to produce luminescence.

19. The method of claim 18, further comprising detecting the luminescence produced from the quantum dot.

20. The method of claim 18, further comprising measuring luminescence intensity produced from the quantum dot and correlating the luminescence intensity with a concentration of quantum dots in the composition.

21. A method for detecting a component within a system, the method comprising:
- providing the quantum dot of claim 1 to the system, wherein the quantum dot further comprises one or more molecules conjugated to the polymer, wherein the one or more molecules have affinity for the component;
- exposing the system to radiation that is effective to produce luminescence from the quantum dot; and
- measuring the intensity of radiation emitted by the quantum dots, wherein an increased intensity correlates with the presence of the component.

22. The method of claim 21, wherein the system is a biological system.

23. The method of claim 22, wherein the molecule is selected from the group consisting of an antibody, a ligand, a receptor, and nucleic acid.

24. The method of claim 23, wherein the molecule has affinity for a target on the component, wherein the target is selected from the group consisting of an antigen, a receptor, ligand, a nucleic acid.

* * * * *

UNITED STATES PATENT AND TRADEMARK OFFICE
CERTIFICATE OF CORRECTION

PATENT NO. : 8,822,955 B2  
APPLICATION NO. : 13/053006  
DATED : September 2, 2014  
INVENTOR(S) : Zhong et al.

Page 1 of 1

It is certified that error appears in the above-identified patent and that said Letters Patent is hereby corrected as shown below:

On the Title Page, in item (56), under "OTHER PUBLICATIONS", in Column 2, Line 17, delete "L.. et al.," and insert -- L., et al., --, therefor.

In the Drawings

In Fig. 3B, Sheet 2 of 5, delete "Time (day)" and insert -- Time (days) --, therefor.

In the Specification

In Column 2, Line 58, delete "hydroxy;" and insert -- hydroxyl; --, therefor.

In Column 9, Line 18, delete "may can be" and insert -- can be --, therefor.

In Column 13, Line 1, delete "the method" and insert -- methods --, therefor.

In Column 15, Line 24, delete "CdSe/Cds/ZnS" and insert -- CdSe/CdS/ZnS --, therefor.

In Column 15, Line 53, delete "Zn/S" and insert -- ZnS --, therefor.

In the Claims

In Column 19, Line 39, in Claim 10, delete "a inorganic" and insert -- an inorganic --, therefor.

In Column 19, Line 40, in Claim 10, delete "a inorganic" and insert -- an inorganic --, therefor.

In Column 20, Line 19, in Claim 14, delete "hydroxy;" and insert -- hydroxyl; --, therefor.

Signed and Sealed this  
Twenty-sixth Day of May, 2015

Michelle K. Lee  
*Director of the United States Patent and Trademark Office*